J. BACHMANN.
Car-Brake.
No. 216,495. Patented June 17, 1879.
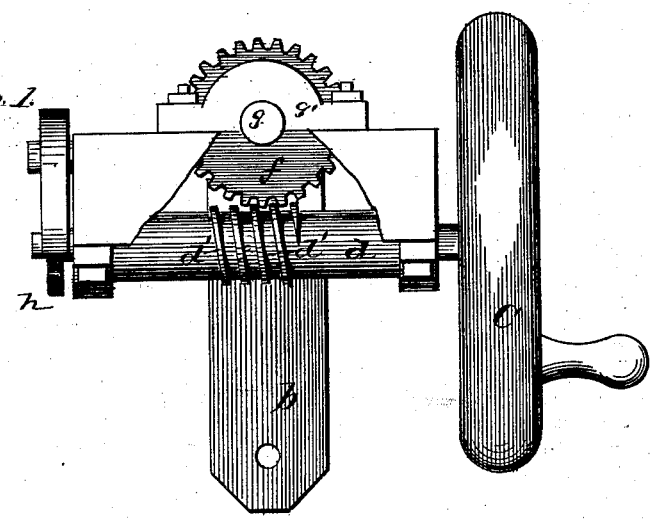
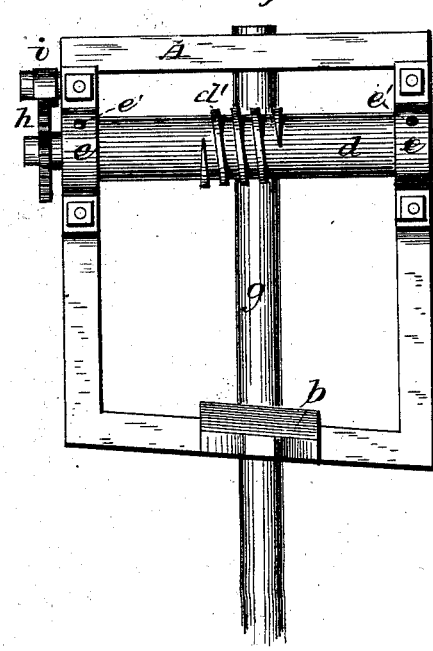
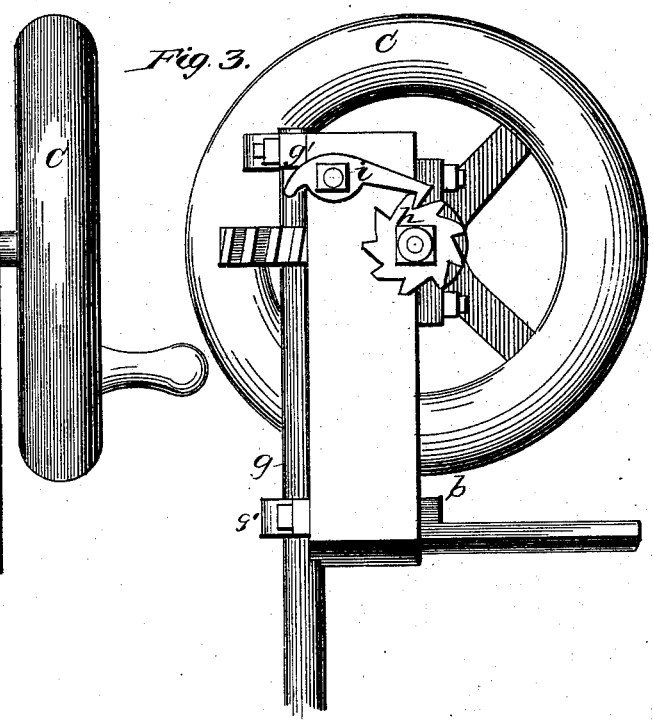

UNITED STATES PATENT OFFICE.

JOSEPH BACHMANN, OF STANFORD, ILLINOIS.

IMPROVEMENT IN CAR-BRAKES.

Specification forming part of Letters Patent No. 216,495, dated June 17, 1879; application filed February 13, 1879.

*To all whom it may concern:*

Be it known that I, JOSEPH BACHMANN, of Stanford, in the county of McLean and State of Illinois, have invented certain new and useful Improvements in Car-Brakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation of my improved mechanism applied to a car. Fig. 2 is a top or plan view of the same, and Fig. 3 is an end elevation.

Referring by letter to the accompanying drawings, A represents a cast-metal frame, and $b$ represents an arm or plate secured to the base of said frame, whereby an additional and also an enlarged bearing-surface for securing said frame in position is provided. This arm or plate $b$ may be either cast in one piece with the frame or it may be formed separately and afterward secured thereto. C represents a heavy cast-metal hand-wheel secured upon the end of a shaft, $d$. The said wheel C is provided with a suitable crank-handle for operating the same, and is also made of such weight that in operation considerable momentum will be acquired. The horizontal shaft upon which this wheel is secured is mounted in journal-bearings formed upon the frame A, substantially as shown. The detachable blocks $e\ e$ of these journals or bearings have the usual openings $e'$ formed in the same for the introduction of lubricating-oil. The shaft $d$ is provided with a screw-thread or worm, $d'$, intermediate of its ends. This screw-thread engages with a gear-wheel, $f$, which is mounted upon a vertical shaft, $g$. This vertical shaft $g$ is carried in suitable bearings $g'$, and serves as a medium for operating any convenient or ordinary lock or brake of a car.

As shown in Fig. 1 the base of the frame is formed with a slant corresponding to the inclined roof of the car, so that when the said frame is applied to the roof the shaft $d$ shall be in a horizontal plane and the shaft $g$ in a vertical position.

Upon the end of shaft $d$, opposite to the driving-wheel, I secure ratchet-wheel $h$, and in conjunction with the same I employ a pawl, $i$, for locking the said shaft. This pawl is pivoted upon the side of the frame, substantially as illustrated.

The device for locking or braking the wheels may be connected with the vertical shaft $g$ by means of rods, chains, or in any suitable manner.

By the employment of this construction and arrangement of operating mechanism the brakeman can lock a train or car with great ease, on account of the leverage obtained by the employment of the horizontal and vertical shafts and the hand-wheel secured upon the end of the shaft, which is mounted in a horizontal plane, as hereinbefore described.

In addition to this the momentum acquired by the employment of the heavy crank or hand-wheel adds greatly to the effectiveness of the device in overcoming the resistance.

As before set forth, the conditions requisite to the successful operation of the wheel are, that it shall be made heavy and be mounted upon the horizontal shaft, and not upon a shaft placed in a vertical position.

By this arrangement of devices the brakeman or operator can turn the wheel with one hand, and thereby apply the brakes, without setting down his lantern and grasping the wheel with both hands, as usual.

In the practical operation of this mechanism, the lock can always be left in such a position as the operator may desire, on account of the weight of the hand-wheel. Also, in practice, the vertical shaft to which the lock-chain is attached may, when found desirable, be considerably enlarged.

What I claim, and desire to secure by Letters Patent, is—

The frame A, with plate $b$, detachable blocks $e\ e$, and openings $e'\ e'$, vertical shaft $g$, and horizontal shaft $d$, with screw-thread or worm $d'$, and the vertical hand or crank wheel C, all constructed and arranged for operation as shown and described.

In testimony that I claim the foregoing as my own I affix my signature in presence of two witnesses.

JOSEPH BACHMANN.

Witnesses:
 HENRY C. WICKE,
 WILLIAM RUF.